Aug. 23, 1960　　　H. J. TROCHE ET AL　　　2,949,741
MOBILE AERIAL TOWER AND CONTROL
Filed Aug. 27, 1956　　　　　　　　　　　　　5 Sheets-Sheet 1

INVENTOR.
HERMAN J. TROCHE
BY WALTER C. WEBB
Bates, Teare & McBean
ATTORNEYS

Aug. 23, 1960  H. J. TROCHE ET AL  2,949,741
MOBILE AERIAL TOWER AND CONTROL
Filed Aug. 27, 1956  5 Sheets-Sheet 2

INVENTOR.
HERMAN J. TROCHE and
BY WALTER C. WEBB
Bates, Teare + McBean
ATTORNEYS Aug. 23, 1960    H. J. TROCHE ET AL    2,949,741
MOBILE AERIAL TOWER AND CONTROL
Filed Aug. 27, 1956    5 Sheets-Sheet 3

INVENTOR.
HERMAN J. TROCHE and
BY WALTER C. WEBB

Bates, Teare & McBean
ATTORNEYS

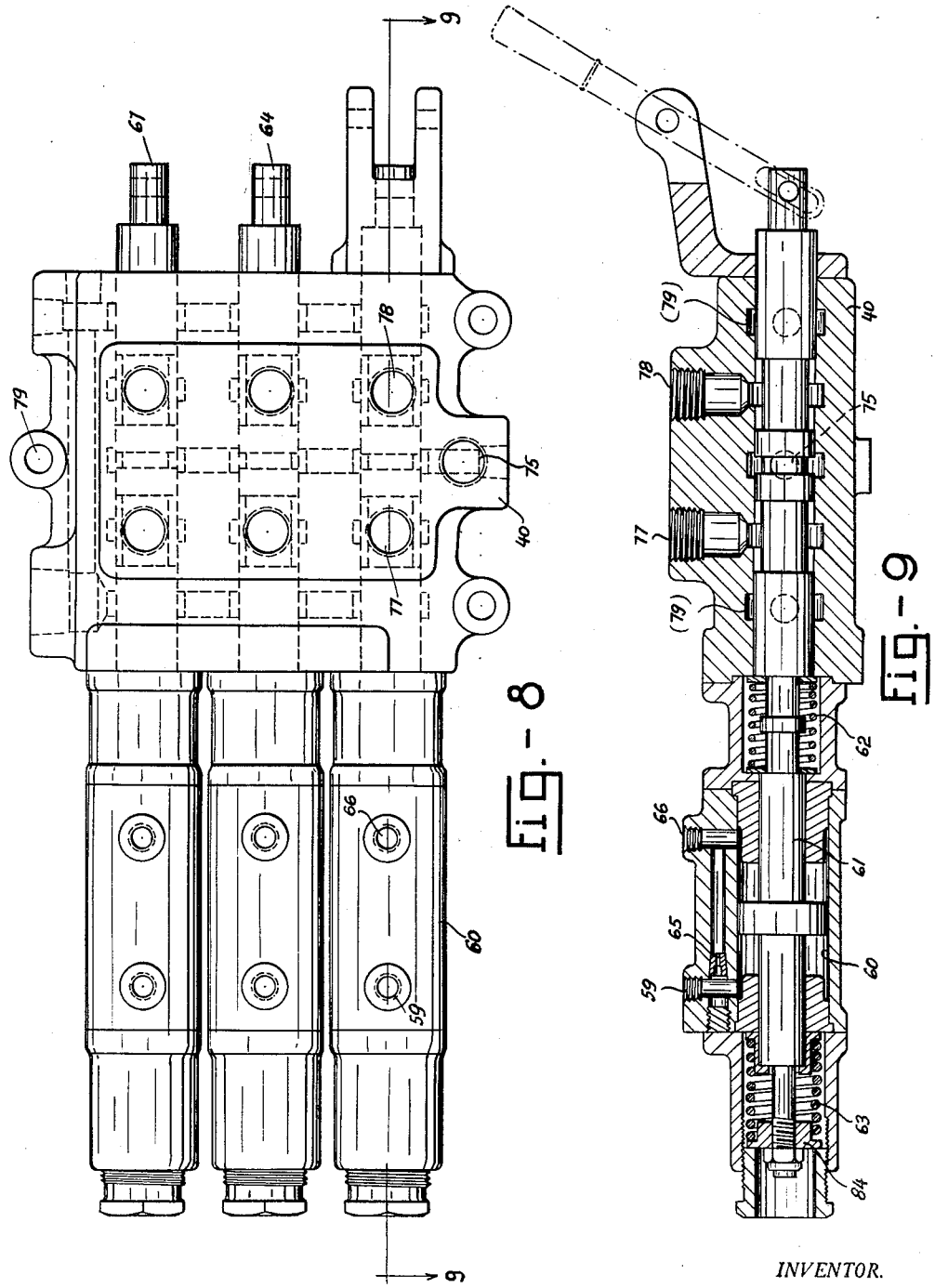

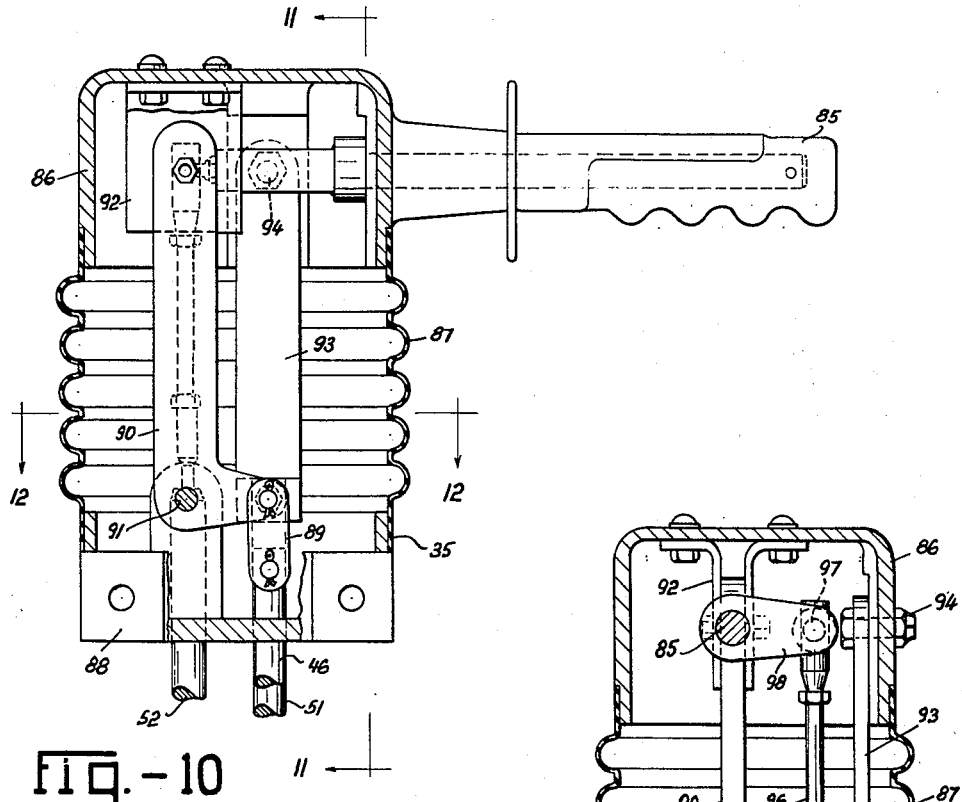
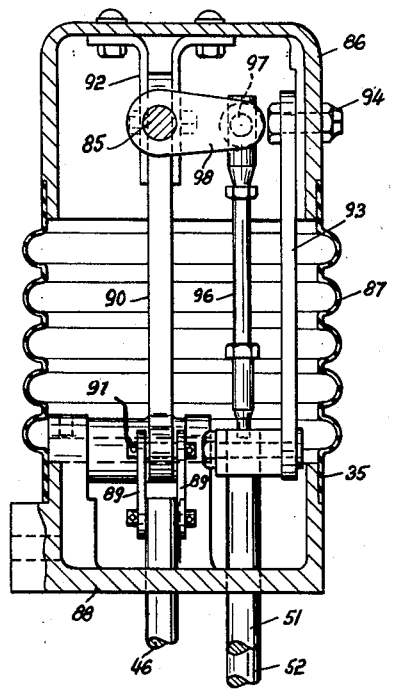
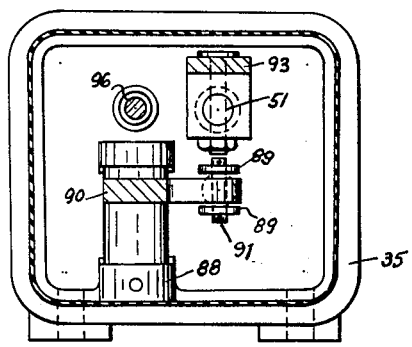

United States Patent Office 2,949,741
Patented Aug. 23, 1960

2,949,741

MOBILE AERIAL TOWER AND CONTROL

Herman J. Troche, Fairview Park, and Walter C. Webb, Cleveland, Ohio, assignors to J. H. Holan Corporation, Cleveland, Ohio, a corporation of Ohio Filed Aug. 27, 1956, Ser. No. 606,288

6 Claims. (Cl. 60—97)

This invention relates generally to a mobile aerial tower which may be carried by a utility vehicle or the like to provide access to overhead traffic lights, street lamps and similar objects for installation, maintenance and repair. The invention is more particularly directed to a collapsible tower which is swingable and tiltable with reference to the supporting vehicle and includes an improved fluid-operated control system for selectively and gradually effecting the various movements under the direct control of a workman on the tower.

Heretofore, because of mechanical difficulty and the economics involved, conventional apparatus of this type has been limited in purpose and operation. Rigidity of construction and indirect control prevented smoothly controlled tower movements and were factors contributing to the limitations which resulted in less than optimum performance. Hence, it is a principal object of this invention to provide a collapsible mobile aerial tower which is capable of smooth universal movement to any selected horizontal or vertical angle and at various extended distances relative to the supporting vehicle, under the direct and continuous control of an operator.

A further object of this invention relates to the provision of an improved fluid operated system for continuously controlling movement of the tower smoothly and accurately throughout its operating range.

A still further object of this invention relates to the provision of a simplified and unitary pilot control arrangement for selectively and gradually activating the fluid operated control system directly from the tower.

Briefly, the foregoing objectives are accomplished in accordance with this invention by mounting a collapsible tower assembly having a plurality of tower sections pivotally connected together in end to end relation on top of a rotatable mast carried by a utility vehicle in such a manner that the entire tower assembly may be rotated in a horizontal plane while each of its sections may be independently tilted in a vertical plane to provide a mobile tower which is capable of universal movement for unlimited access to any work area within its range. Movement of the mast and the tower sections is accomplished by selectively actuating fluid motors which are remotely controlled by a pilot control from a work platform on the tower. The control system for the fluid actuated motors is continuously active on a standby basis whereby one or more of the fluid actuated motors may be operated by a workman on the platform to provide individual or compound movement of the tower sections and mast. The operative elements of the control system are arranged to gradually apply the operating fluid to the fluid motors and thereby provide a smooth and accurate control of the movable tower elements. An auxiliary control is accessible at the base of the tower to permit independent controlled movement of the tower elements in case of emergency or special circumstances.

In the drawings:

Fig. 8 is a plan view of a distributor valve operative in the system;

Fig. 9 is a sectional view taken along the lines 9—9 in Fig. 8 of the drawings;

Fig. 10 is a sectional view through the handle assembly that controls the pilot valve;

Fig. 11 is a sectional view taken along the lines 11—11 in Fig. 10 of the drawings; and Fig. 12 is a sectional view taken along the lines 12—12 in Fig. 10 of the drawings.

Figure 1:
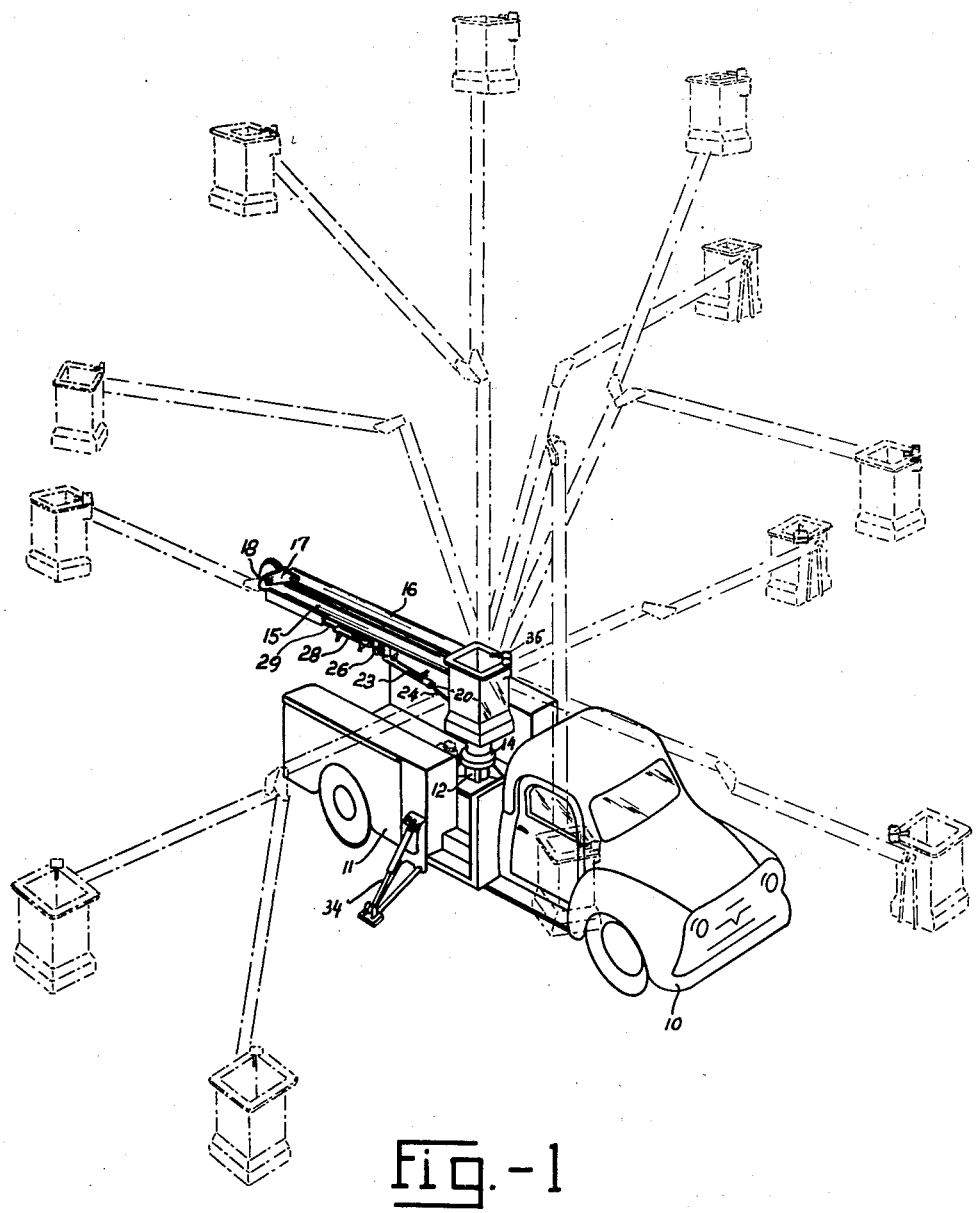
Fig. 1 is a perspective view of a utility vehicle carrying the mobile aerial tower with different positions of the tower shown in dotted lines.
Figure 2:
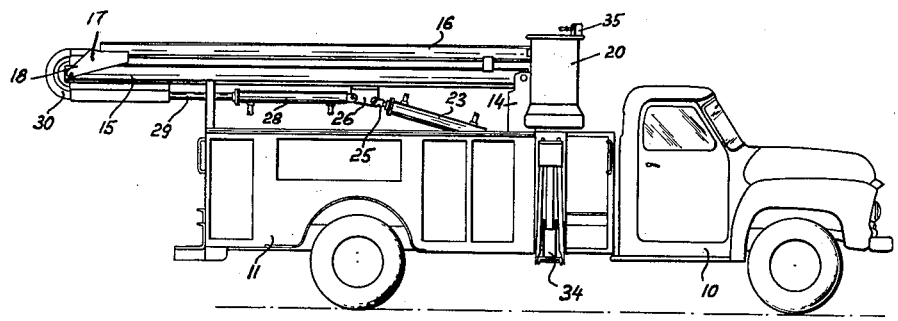
Fig. 2 is a side elevation of the utility vehicle with the mobile tower collapsed in carrying position.
Figure 3:
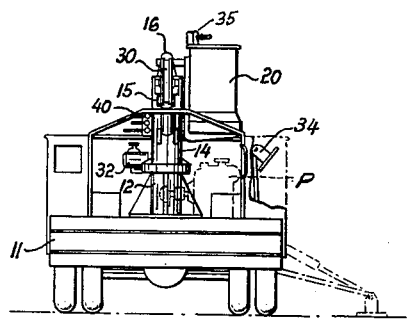
Fig. 3 is a rear view of the utility vehicle illustrating the disposition of the mast and tower on the vehicle body.

Referring now more particularly to Figs. 1, 2 and 3 of the drawings there is shown a wheeled utility vehicle 10 having a truck body 11 which supports a vertical mast 12. The upper portion 14 of the mast is rotatable through 360° and supports a collapsible tower assembly at its upper extremity. The tower assembly includes a pair of tower sections 15 and 16 pivotally interconnected in end to end relation through the saddle member 17 and carries a work platform 20 at its upper extremity. The lower tower section 15 is pivotally connected to the upper extremity 14 of the rotatable mast for tilting movement in a vertical plane and the pivotal interconnection between the upper and lower tower sections is such that the upper section 16 is pivotal in a vertical plane relative to the lower section 15. The work platform 20 is in the form of an enclosed box-like structure which is pivotally supported in cantilever fashion from the upper extremity of the upper tower section 16 so that as the tower sections 15 and 16 are tilted in a vertical plane the work platform can be maintained level for any tilted position of the tower sections.

The lower tower section 15 is tilted by means of a fluid actuated piston motor whose cylinder 23 is anchored to a bracket 24 carried by the rotatable portion 14 of the mast 12 and whose piston rod 25 is pivotally connected to a bracket 26 mounted intermediate the ends of the lower tower section 15. The upper tower section 16 is tilted in similar fashion by means of a fluid actuated piston motor whose cylinder 28 is pivotally connected to the bracket 26 and whose piston rod 29 has a flexible link connection 30 extending about an arcuate guide member 18 on the lower tower section 15 and connected at its opposite extremity to the upper tower section 16 in such manner that retraction of the piston rod 29 within the cylinder 28 will cause the upper tower section 16 to swing in a vertical plane. The upper portion 14 of the mast is rotated by means of fluid actuated motor 32 which has a suitable driving connection with the upper portion of the mast.

In order to insure stability in operation of the tower sections and mast, the vehicle body 11 is preferably anchored in stationary position by means of fluid actuated jacks 34 which are capable of retractably extending outwardly from the sides of the vehicle body to engage the ground surface. The jacks 34 are extended and retracted into tool portions of the truck body 11 in response to suitable fluid actuated motors in a manner to be hereinafter more fully described.

The upper portion 14 of the mast may be rotated about its vertical axis and each of the tower sections 15 and 16 may be independently tilted in a vertical plane about their respective pivots to attain any selected position in the horizontal and vertical plane along a variable radial distance extending from the vertical axis of the mast to the extended distance of both tower sections as best shown in the dotted lines in Fig. 1. This universality of movement of the work platform 20 relative to the supporting vehicle body 11 provides virtually unlimited access to any point relative to the anchored vehicle and within the dimensional limits of its structural elements.

Controlled operation of the collapsible tower to present the work platform 20 at any desired location is accomplished by selectively supplying operating fluid to each of the fluid motors through a control system diagrammatically illustrated in Fig. 4 of the drawings and hereinafter more fully described. The control system is pilot actuated by means of a control device 35 which is mounted on the work platform 20 so that the workman can operate and relocate the platform at will from a station on the platform. For ease of illustration, the fluid lines interconnecting the respective controlled members and the fluid actuated motors are not shown in detail in Figs. 1 through 3; it being understood that the fluid lines diagrammatically shown in the control system of Fig. 4 can be supported on the tower assembly in any suitable and convenient manner.

Figure 4:
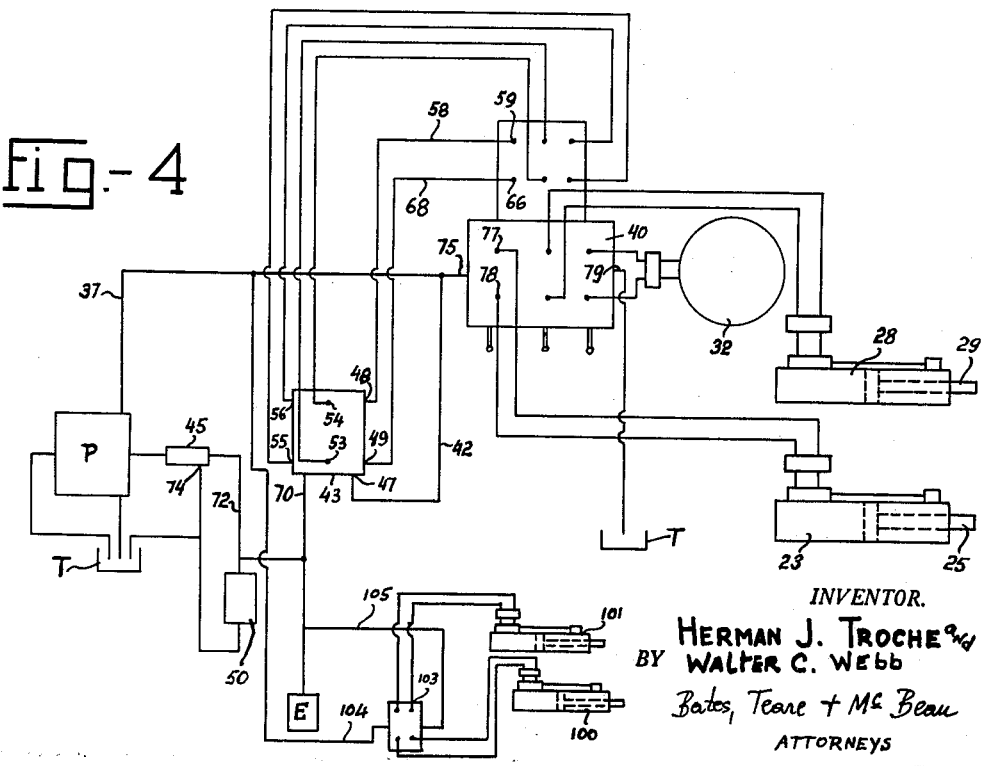
Fig. 4 is a diagrammatic illustration of the fluid control system for the mobile tower.

Referring now more particularly to Fig. 4 of the drawings, operating fluid is supplied to the control system by a variable output pump P which may be engine driven or which may be coupled to a power take-off on the drive shaft of the vehicle transmission to pump operating fluid from a reservoir T supported on the truck body 11, such arrangements being well known in the art. In its preferred form, the variable out-put of the pump P takes the form of a low-pressure output when idling and a high-pressure output when driven at a higher speed. The pump P is preferably pilot controlled and of conventional design having internal ports and spring regulated valves (not forming part of this invention and therefore not shown) for controlling the variable output.

The output of the pump is continuously supplied through line 37 to the inlet of a distributor valve 40; the detailed construction of which is best shown in Figs. 8 and 9 of the drawings. The distributor valve 40 is a pilot operated type wherein the pressure of the operating fluid actuates the valve spools to distribute the operating fluid selectively through various ports in the valve body. The detailed operation of the distributor valve 40 will be hereinafter more fully described, it being sufficient for the present purpose to indicate that when the pump P is operating in its low pressure or idling stage the pressure is insufficient to actuate any of the distributor valve spools. A branch conduit 42 supplies the pump output to a pilot valve 43 whose valve spools are manually positioned in a manner to be hereinafter more fully described to supply operating fluid to the actuating portion of the distributor valve 40.

Figure 6:
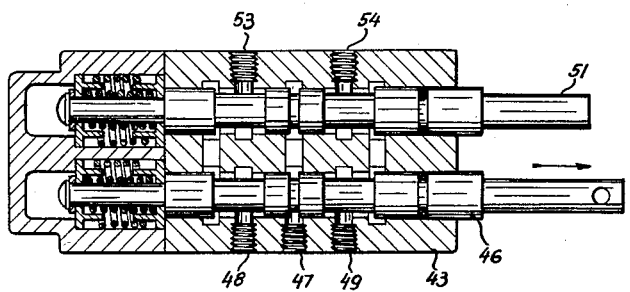
Fig. 6 is a section taken along the lines 6—6 in Fig. 5 of the drawings.
Figure 5:
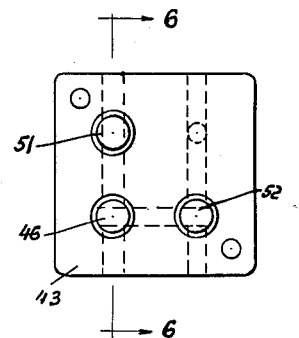
Fig. 5 is an end view of the pilot valve for the control system.

The low pressure output of the pump P is by-passed through a shut-off valve 45 which returns the low pressure output to the reservoir T. When it is desired to operate the distributor valve 40 to selectively supply operating fluid to one of the fluid motors, a corresponding valve spool such as 46 of the pilot valve assembly 43 is mechanically positioned to connect the fluid supply from an inlet port 47 to either one of the outlet ports 48 or 49 depending on which direction the valve spool is positioned (Figs. 5 and 6). The pilot valve 43 is a closed-center type valve having special relief passages in its casing at all ports providing balanced spools and at the same time permitting passage of fluid to each spool regardless of the position of any of the other valve spools. The valve spools 51 and 52 operate to control flow through corresponding outlet ports 53, 54 and 55, 56 respectively. Thus, the pilot valve 43 is conditioned at all times to transfer operating fluid from the inlet port 47 to any one of the outlet ports depending upon which one of the spools is axially positioned within the casing.

Figure 7:
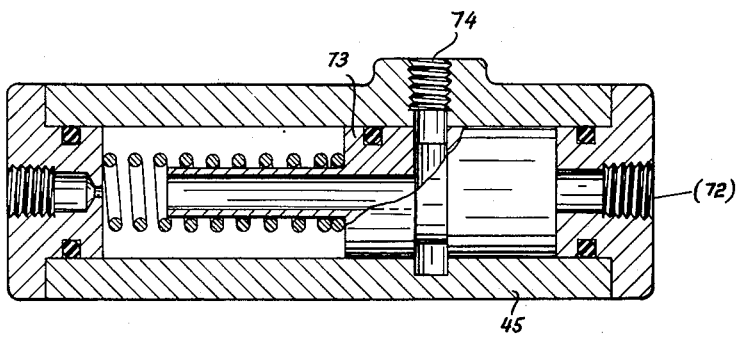
Fig. 7 is a sectional view of a shut-off valve operative in the system.

By way of example, if the pilot valve spool 46 is moved in the direction indicated by the arrow in Fig. 6 it connects the inlet port 47 to the outlet port 48 and directs the operating fluid through line 58 to the control port 59 of the distributor valve 40, thus pressurizing a portion of a control cylinder 60 and exerting a force against distributor valve spool 61 (Fig. 8); all of this occurring while the pump P is still operating in its low pressure stage. The low pressure output of the pump P is insufficient to overcome the biasing force of the springs 62 and 63 and therefore is incapable of positioning the corresponding distributor valve spool 61. Thus, the low pressure fluid passes through an orifice 65 in the control cylinder of the distributor valve 40 and out the port 66 to return through line 68 to the pilot valve 43 where it is connected to return line 70. The low pressure operating fluid is then directed through line 72 to the shut-off valve 45 (the detailed construction of which is best shown in Fig. 7) causing the plunger 73 to close the by-pass port 74 of the shut-off valve and connecting the pump P directly to the supply line 37. Simultaneously, the low pressure fluid is also supplied to an engine throttle control E which is arranged to open the engine throttle in response to pressurization and thereby speed up the engine and the pump operation to a predetermined speed corresponding to the desired high pressure output of the second stage of the pump. A suitable pressure relief valve 50 is provided to maintain a predetermined system operating pressure.

The high pressure output of the pump P then passes through the line 37 to the main inlet port 75 of the distributor valve and through the branch line 42 through the pilot valve 43 to the control cylinder 60 of the distributor valve 40 where it is sufficient to overcome the bias of the centering springs 62 and 63 and causes axial movement of the distributor valve spool 61 in a predetermined direction to connect the inlet port 75 with a distributor port 77 and thereby supply fluid under relatively high operating pressure to the cylinder 23 of the corresponding fluid motor.

In the example under consideration, the operating fluid is supplied to the cylinder 23 through a line connected to the port 77 and displaces a corresponding amount of fluid in the return line to distributor port 78 which returns the displaced fluid to the distributor valve casing and thence through a discharge port 79 which communicates with the reservoir T, thereby providing a selective control of the position of the fluid motor piston rod 25 depending upon the degree and length of time that the pilot valve spool 46 is positioned to supply operating fluid to the control cylinder 60 of the distributing valve 40. Reverse movement of the fluid motor is accomplished by simply positioning the pilot valve spool 46 in a reverse direction to connect the other outlet port 49 with the control port 66, whereby the operating fluid is supplied to the opposite end of the control cylinder 60 to position the distributor valve spool 61 in the opposite direction and thereby to connect the other distributor port 78 with the inlet port 75 and at the same time reverse the supply and return lines at the corresponding fluid motor.

Each of the fluid motors may be actuated independently by selective actuation of the corresponding pilot valve spool or they may be actuated in unison to accomplish a compound movement of the tower assembly by multiple actuation of the pilot valve spools. Thus, the valve spools 51 and 52 respectively control the corresponding distributor valve spools 64 and 67 to supply operating fluid to the cylinder 28 and the fluid motor 32 in a manner similar to the supply of operating fluid to the cylinder 23. The pilot and distributor valves are designed to provide a smooth and accurate control of the fluid motor operation with gradual acceleration and deceleration in the movement of the operative members of the tower assembly. Such design includes controlling the size of the orifice 65 in the control cylinder 60 of the distributor valve 40 and proper selection of spring tension for the biasing springs 62 and 63 on the distributor valve spools, as well as proper selection of biasing spring tension in the pilot control valve 43.

In the distributor valve 40, the orifice 65 is so designed that when low pressure fluid is directed through the control port 59 into the control cylinder 60, the movement of the distributor valve spool 46 is resisted by the spring 62 so that the operating fluid flows through the orifice 65 and out the other control port 66 returning to the reservoir T until the flow is such through the port 59 that the pressure will build up sufficiently in the control cylinder 60 to cause the distributor valve spool 61 to move against the spring 62. As the flow of fluid into the control port 59 is increased pressure in the control cylinder 60 is increased, but the flow through the orifice 65 is also increased, thereby providing a cushioning effect and eliminating abrupt movements on the valve spool 61. Flow of fluid to the port 59 may be controlled by special metering grooves in the pilot valve 43 and, similarly, flow of fluid from the inlet port 75 to either of the outlet ports 77 or 78 of the distributor valve spool 61. Further throttling action is accomplished by cushioning the movement of the distributor valve spool 61 by means of the spring 63 which can be tensioned by tightening the nut 84 to resist movement to an extent where the increased pressure in the control cylinder 60 that will be required to move the spool 61 will have a gradual build-up only because escape of fluid through the orifice 65 will increase proportionately to the increase in the control cylinder, thereby eliminating sudden movements of the spool 61.

As hereinbefore indicated, the spools of the pilot valve 43 may be positioned individually or they may be positioned together in various combinations to accomplish individual or compound movements of the various operative members of the tower assembly. Such actuation of the pilot valve spools can be accomplished by means of manually operated levers mechanically connected to accessible extremities of the valve spools or by any other suitable means subject to direct or remote control. In the preferred embodiment of the invention, there is provided a unitary manual control device 35 for positioning the pilot valve spools; this device preferably being located on the work platform 20 remote from the casing of the distributor valve 40, which is preferably supported on the rotatable portion 14 of the mast 12. With this preferred arrangement, both the manual control device 35 and the pilot valve 43 are carried by the work platform 20 in operative proximity to each other; the manual control device 35 having mechanical connections to the valve spools of the pilot valve 43 as will be hereinafter more fully described. In order to reduce the possibility of error and confusion and permit efficient manipulation of the tower assembly by a workman-operator with one hand, thereby leaving the other hand of the operator free for other operations, the manual control device 35 preferably takes the unitary single-handle form shown in Figs. 10 through 12 of the drawings.

Thus the manual control device 35 includes a plurality of links and levers which interconnect a single operating handle 85 with each of the pilot valve spools, whereby diverse manipulation of the handle by an operator will be transmitted to a selected one of the pilot valve spools to position it in the desired direction. The handle 85 is shown carried by a cap 86 which surmounts a hollow flexible housing 87 having a bottom plate 88 through which valve spool extensions extend for interconnection with the operating links enclosed within the housing. The valve spool 46 is shown interconnected through links 89 to a bell crank portion of a lever 90 which has a pivotal connection 91 to a portion of the housing base at its lower end and has its upper end pivotally connected to a bracket 92 carried by the cap 86. The operation is such that when the handle 85 is displaced with the cap 86 in a horizontal plane, it operates through the lever 90 and bell crank connection to the link 89 to position the valve spool 46 upwardly or downwardly, depending upon whether the handle 85 is moved to the left or right as viewed in the drawings.

The valve spool 51 has a link connection 93 to a pivot pin 94 on the cap 86 so that when the handle 85 is tilted vertically, the cap 86 lifts or lowers the valve spool 51, depending upon whether the handle is lifted or lowered. In similar fashion, the valve spool 52 is connected with the handle 85 by means of a vertically extending rod 96 which has a pivotal connection 97 to the free end of a link 98 which is keyed at its other end on the handle 85. As the handle 85 is rotated about its own axis it will lift or lower the rod 96 and thereby lift or lower the valve spool 52, depending upon whether the handle is turned to the right or left respectively. The single-handle, multiple control device 35 permits actuation of any one of the fluid motors independently or in any selected combination simply by independent or combined shifting of the handle 85 in the horizontal plane, or in a vertical plane, or by rotating it about its axis.

As previously noted, the stabilizing jacks 34 are also extended and retracted by fluid actuated motors. Such motors are shown at 100 and 101 (one for each sidejack) in Fig. 4 and are operably connected across the supply and return lines 37 and 70 of the system through a conventional four-way valve 103 and branch lines 104 and 105. Thus, the jacks 34 are extended and clamped in place from both sides of the vehicle body 11 when the pump P is operating in its high-pressure stage to anchor the vehicle during operation of the mobile tower.

Thus, there has been provided a collapsible mobile tower which is capable of universal movement to any position in the horizontal and vertical plane relative to its supporting vehicle to provide unlimited access for a workman-operator on the tower platform to any selected location within the dimensional limits of the tower assembly. The operation is controlled by fluid actuated motors which may be selectively operated under the direct control of the workman-operator by manipulation of a control device on the work platform. The control system is designed and arranged to provide smooth and accurate control for each of the fluid actuated motors and has a pilot control which may selectively actuate any one or more of the motors individually or in any selected combination. The system is powered from a variable output pump which is always available on the standby basis by virtue of a suitable by-pass arrangement which is also controlled by the pilot control. The control system includes a distributor arrangement which is gradually responsive to the pilot control and which cooperates in providing a smooth and accurate control. The distributor is preferably located on the truck body adjacent the rotatable mast and provided with suitable auxiliary controls accessible to persons other than the workman-operator on the platform, thereby providing a degree of safety and overriding control in the event of emergency or special circumstances.

We have shown and described what we consider to be the preferred embodiments of our invention along with suggestions of modified forms, and it will be obvious to those skilled in the art that other changes and modifications can be made without departing from the scope of our invention as defined by the appended claims.

We claim:

1. In a multi-element aerial tower having a plurality of fluid actuated motors for independently moving the tower elements relative to each other, a control system comprising, a variable pressure source of operating fluid having a low pressure stand-by output and a higher pressure operating output, a multistage distributing valve having a plurality of slide values controlling each stage, means operative in response to the application of the higher operating fluid pressure to selectively position the slide valves and divert the operating fluid to each of said fluid motors, pilot-controlled means for increasing the source output from a stand-by to an operating level and for directing said operating fluid pressure to said distributing valve means, and means for controlling the flow of operating fluid to the distributing valve to provide a gradual response in the distributing valve operation.

2. In an apparatus having a plurality of fluid-actuated motors, a control system comprising, a variable pressure source of operating fluid having a normally low pressure output a multi-stage distributing valve having an inlet and a discharge and each stage having spaced distributing ports connected to supply and return operating fluid to and from a corresponding fluid motor, a slide valve in each stage for controlling the flow of operating fluid therethrough respectively, means biasing each slide valve in a closed center position to isolate the respective distributing ports from the valve inlet and discharge, means in each stage responsive to a predetermined high operating fluid pressure to position the corresponding slide-valve in either direction to reversely connect the distributing ports with the valve inlet and discharge respectively, pilot-controlled means for selectively supplying operating fluid to the slide valve positioning means of each stage and to the distributing valve inlet, by-pass means coacting in each stage to gradually apply the operating fluid to the corresponding slide-valve positioning means, and means responsive to activation of said pilot-controlled means for increasing the output of the variable pressure source from the normal low pressure output to a predetermined higher operating fluid pressure.

3. The control system of claim 1, wherein said slide-valve positioning means includes an operating piston on each valve spool, a control member for each operating piston having a fluid inlet and outlet disposed on opposite sides of the corresponding operating piston, and wherein said by-pass means includes a restricted passage establishing communication between each chamber inlet and outlet, the size of said restricted passage being related to the force of said biasing means in such manner that the operating fluid is bypassed therethrough until it gradually attains the predetermined operating pressure sufficient to overcome the bias on the corresponding valve spool.

4. In an apparatus having a plurality of fluid-actuated motors, a control system comprising, a variable pressure source of operating fluid having a normally low pressure output, multi-stage distributing valve means, each stage having an inlet and outlet port for directing and returning operating fluid to and from a corresponding fluid motor, a piston slide-valve in each stage, means coacting in each stage in response to the application of a predetermined increased operating pressure thereto to position the corresponding slide valve to control the flow through the corresponding ports, means normally by-passing said distributing valve positioning means with the low pressure output, pilot-controlled means for increasing the source pressure and selectively applying the increased operating pressure to one or more of said slide valve positioning means.

5. In an apparatus having a plurality of fluid-actuated motors, a control system comprising, a variable pressure continuous source of operating fluid having normally low pressure output, multi-stage distributing valve means having an inlet and outlet and each stage having distributing ports for supplying and returning operating fluid to and from a corresponding fluid motor, a slide valve operable in each stage to control the flow through the corresponding distributing ports, each slide valve having a piston normally biased in position to isolate the distributing ports from the inlet and outlet disposed on opposite sides of the corresponding piston, a supply and return conduit interconnecting the source with the inlet and outlet respectively of the distributing valve means, multi-stage pilot-controlled valve means having an inlet and outlet and each stage having spaced ports, branch conduits independently connecting the spaced ports of each stage with an inlet and outlet respectively of a corresponding control chamber, a slide valve in each pilot valve stage for controlling the flow through the corresponding spaced ports, means biasing each of said pilot slide valves in position to isolate the corresponding spaced ports from the pilot valve inlet and outlet, externally accessible means for positioning each of said pilot slide valves, a branch conduit connecting the supply conduit with the pilot valve inlet, another branch conduit connecting the pilot valve outlet to the return side of said source, means coupled and responsive to the operating fluid in said pilot valve return conduit to increase the pressure of the source to a predetermined level sufficient to overcome the bias on any of said distributing slide valve pistons and to operate any of the fluid motors, a by-pass conduit interconnecting the output side with the return side of the source, a normally open valve in said by-pass conduit having means for closing said by-pass conduit in response to the application of said predetermined increased operating pressure, and a branch conduit for applying said increased operating pressure from the pilot valve return conduit to said last-mentioned means, whereby the full output of the source is supplied directly to the inlets of the pilot and distributing valve means.

6. The control system of claim 5 wherein each stage of said distributing valve means and each stage of said pilot valve means includes means for reversely connecting the corresponding ports to the corresponding inlet and outlet of each of said valve means respectively depending upon the direction of movement of the corresponding slide-valves from their normally biased positions, and wherein said pilot valve positioning means is adapted to selectively position each corresponding valve spool in opposite directions from its normally biased position.

References Cited in the file of this patent

UNITED STATES PATENTS

| | | |
|---|---|---|
| 1,407,993 | Earl | Feb. 28, 1922 |
| 1,965,689 | Cowan et al. | July 10, 1934 |
| 1,967,376 | Smith et al. | July 24, 1934 |
| 1,992,048 | Temple | Feb. 19, 1935 |
| 2,450,152 | Miller | Sept. 28, 1948 |
| 2,499,235 | Tyson | Feb. 28, 1950 |
| 2,551,286 | Poetker | May 1, 1951 |
| 2,664,708 | Norelius et al. | Jan. 5, 1954 |
| 2,705,971 | Dorkins | Apr. 12, 1955 |
| 2,792,847 | Spencer | May 21, 1957 |